(12) United States Patent
Tsutsumi et al.

(10) Patent No.: US 10,105,003 B2
(45) Date of Patent: Oct. 23, 2018

(54) BEVERAGE DISPENSER

(71) Applicant: SANDEN HOLDINGS CORPORATION, Isesaki-shi (JP)

(72) Inventors: Taiichi Tsutsumi, Isesaki (JP); Mitsuo Suzuki, Isesaki (JP)

(73) Assignee: SANDEN HOLDINGS CORPORATION, Isesaki-shi (JP)

( * ) Notice: Subject to any disclaimer, the term of this patent is extended or adjusted under 35 U.S.C. 154(b) by 466 days.

(21) Appl. No.: 14/695,940

(22) Filed: Apr. 24, 2015

(65) Prior Publication Data

US 2016/0058241 A1 Mar. 3, 2016

(30) Foreign Application Priority Data

Aug. 29, 2014 (JP) .................................. 2014-176096

(51) Int. Cl.
| | |
|---|---|
| *A47J 31/56* | (2006.01) |
| *A47J 31/24* | (2006.01) |
| *A47J 31/52* | (2006.01) |
| *A47J 31/32* | (2006.01) |

(52) U.S. Cl.
CPC .............. *A47J 31/52* (2013.01); *A47J 31/32* (2013.01)

(58) Field of Classification Search
CPC .. A47J 31/24; A47J 31/32; A47J 31/52; A47J 31/34; A47J 31/36

USPC ............ 99/302 R, 285, 280, 289 T, 287, 292
See application file for complete search history.

(56) References Cited

FOREIGN PATENT DOCUMENTS

| | | |
|---|---|---|
| JP | 63-47899 | 2/1988 |
| JP | 04-188396 | 7/1992 |
| JP | 2010-067211 | 3/2010 |
| JP | 53-88517 | 1/2014 |

OTHER PUBLICATIONS

Office Action dated May 22, 2018 which issued in the corresponding Japanese Patent Application No. 2014-176096.

*Primary Examiner* — Ibrahime A Abraham
*Assistant Examiner* — Justin Dodson
(74) *Attorney, Agent, or Firm* — Cozen O'Connor

(57) ABSTRACT

A beverage dispenser, in which a filter is arranged between the lower end of a brewing chamber and an upper end of a fluid receptacle. A beverage brewed by supplying a raw material and water to the chamber is forced to drip into the fluid receptacle through the filter F, and delivered to a cup along a beverage path. The beverage dispenser includes: a pressure difference generator for generating a pressure difference between the chamber and the fluid receptacle to force the beverage to drip into the fluid receptacle, and to deliver the beverage to the cup; a pressure sensor for measuring the pressures in the fluid receptacle or in the chamber; and a controller that sequentially determines an interval average for pressure measured by the pressure sensor, and halts, based on results of the interval averages, a drip-brewing and delivering operation for the beverage.

17 Claims, 8 Drawing Sheets

BEVERAGE DISPENSER

CROSS-REFERENCE TO RELATED APPLICATION

The application claims priority to Japanese Patent Application No. 2014-176096, filed on Aug. 29, 2014.

BACKGROUND OF THE INVENTION

1. Field of the Invention

The present invention relates to a beverage dispenser that brews beverage by employing a beverage raw material and water, and serves the beverage.

2. Description of Related Art

A generally known beverage dispenser is a beverage dispenser that employs, as a beverage raw material, ground coffee obtained by grinding coffee beans using a grinder, or tea leaves for green tea, etc., and that brews a beverage, such as coffee or tea, by supplying this material and water (hot water or cold water) to a brewing chamber, and delivers the obtained beverage into a cup to serve for a user. For the beverage dispenser of beverage brewing type, a fluid receptacle is generally arranged at the lower end of the brewing chamber through a filter, and the beverage brewed by the brewing chamber is forced to drip through the filter into the receptacle (drip brewing), and the thus produced beverage is delivered to a cup along a beverage path that is connected to the fluid receptacle.

This type of beverage dispenser generates a pressure difference between the air pressure in the brewing chamber and the air pressure in the fluid receptacle, and employs the pressure difference to force the beverage to drip into the fluid receptacle, and thereafter to feed the beverage into a cup through the beverage path. Generally, the beverage dispenser of the beverage brewing type is classified into two types, a pressurization type for generating a difference in pressure by supplying compressed air to the brewing chamber, and a negative-pressure suction type for generating a difference in pressure by drawing the air from the fluid receptacle.

More particularly, the pressurization type beverage dispenser has an arrangement that includes an air pump that supplies compressed air to the brewing chamber to pressurize the brewing chamber, forces the beverage to drip from the brewing chamber into the fluid receptacle, and delivers the filtered beverage into a cup through the beverage path.

The negative-pressure suction type beverage dispenser has an arrangement that includes a tube pump disposed partway along the beverage path. The tube pump draws air from the fluid receptacle to reduce the pressure in the fluid receptacle, forces the beverage to drip from the brewing chamber into the fluid receptacle, and delivers the filtered beverage into a cup through the beverage path by suction.

In this type of beverage dispenser, the brewed beverage in the brewing chamber is gradually reduced by forcing the beverage to drip into the fluid receptacle through the filter, and brewing of the beverage is thereafter completed. After the brewing has been completed, it is required that the air pump or the tube pump should be stopped, and the operation should be shifted to the succeeding control operation (e.g., standby control for moving the individual components, such as the fluid receptacle, to standby positions). The determination as to whether brewing has been completed (whether there is no more beverage left in the brewing chamber) is performed based on, for example, the pressure in the brewing chamber or in the fluid receptacle that is measured by a pressure sensor. When it is ascertained that the brewing has been completed, the air pump is halted in case of the pressurization type, or the tube pump is halted in case of the negative-pressure suction type, and as a result, feeding of the beverage to a cup is completed, and the operation is shifted to the succeeding control operation.

A beverage dispenser of pressurization type disclosed in Japanese Patent Application Laid-Open Publication No. S63-47899 is known as a beverage dispenser that determines the completion of brewing in accordance with the pressure level. The pressurization type beverage dispenser disclosed in Japanese Patent Application Laid-Open Publication No. S63-47899 is provided by focusing on a phenomenon that when compressed air is supplied to the brewing chamber by the air pump, the pressure in the fluid receptacle is increased, and when the beverage in the brewing chamber is exhausted, the pressure in the brewing chamber is reduced, and by employing an arrangement in which a pressure sensor detects a timing of reduction of the pressure in the brewing chamber, and it is determined, at this detection timing, that the beverage in the brewing chamber is exhausted, and thereafter, the air pump is halted. Specifically, when it is determined that the pressure currently measured is lower than the preceding pressure that was measured, the air pump is halted.

According to this type of beverage dispenser, for the pressurization type, the overall pressure fluctuation tendency is changed from a tendency to increase to a tendency to reduce, or for the negative-pressure suction type, the overall pressure fluctuation tendency is changed from the tendency to reduce to the tendency to increase. However, actually for either method, the pressure is fluctuated by frequently repeating the increase or decrease in short time intervals.

However, in the beverage dispenser in Japanese Patent Application Laid-Open Publication No. S63-47899, the control for halting the air pump is performed merely based on the results obtained by comparing the currently measured pressure with the preceding measured pressure, and in the state in which the pressure frequently fluctuates, completion of brewing may be erroneously determined before the brewing is actually completed. Therefore, there is a possibility, for the beverage dispenser disclosed in Japanese Patent Application Laid-Open Publication No. S63-47899, that the air pump cannot be halted at an appropriate timing, and a proper amount of beverage cannot be served for a user. As for the beverage dispenser of negative-pressure suction type, it is conceivable that the tube pump will be halted based on the results obtained by comparing the measured pressure with the preceding measured pressure; however, in this case, there is also a possibility that the tube pump cannot be halted at an appropriate timing, and therefore, more improvement is required.

While taking the actual circumstances into account, the object of the present invention is to provide a beverage dispenser that can halt a pressure difference generator, such as an air pump or a tube pump, at an appropriate timing in the state in which the pressure in a brewing chamber and in a fluid receptacle rapidly fluctuates.

SUMMARY OF THE INVENTION

To achieve the above object, a beverage dispenser according to one aspect of the present invention, in which a filter is arranged between a lower end of a cylindrical brewing chamber and an upper end of a fluid receptacle, and a beverage that has been brewed by supplying a raw material and water to the brewing chamber is forced to drip into the fluid receptacle through the filter, and is thereafter delivered to a cup along a beverage path, comprises:

a pressure difference generator for generating a pressure difference between a pressure in the brewing chamber and a pressure in the fluid receptacle to force the beverage to drip into the fluid receptacle, and to deliver the beverage to the cup;

a pressure sensor for measuring the pressure in the fluid receptacle or the pressure in the brewing chamber; and a controller that sequentially determines, for each interval having a preset time length, an interval average (an interval representative value) of a plurality of values for pressure measured by the pressure sensor, and halts, based on results of comparison of the interval averages, a drip-brewing and delivering operation for the beverage performed by the pressure difference generator.

Other objects and features of aspects of the present invention will be understood from the following description with reference to the accompanying drawings.

DESCRIPTION OF PREFERRED EMBODIMENTS

The embodiments of the present invention will now be described with reference to the accompanying drawings.

First Embodiment

Figure 1:
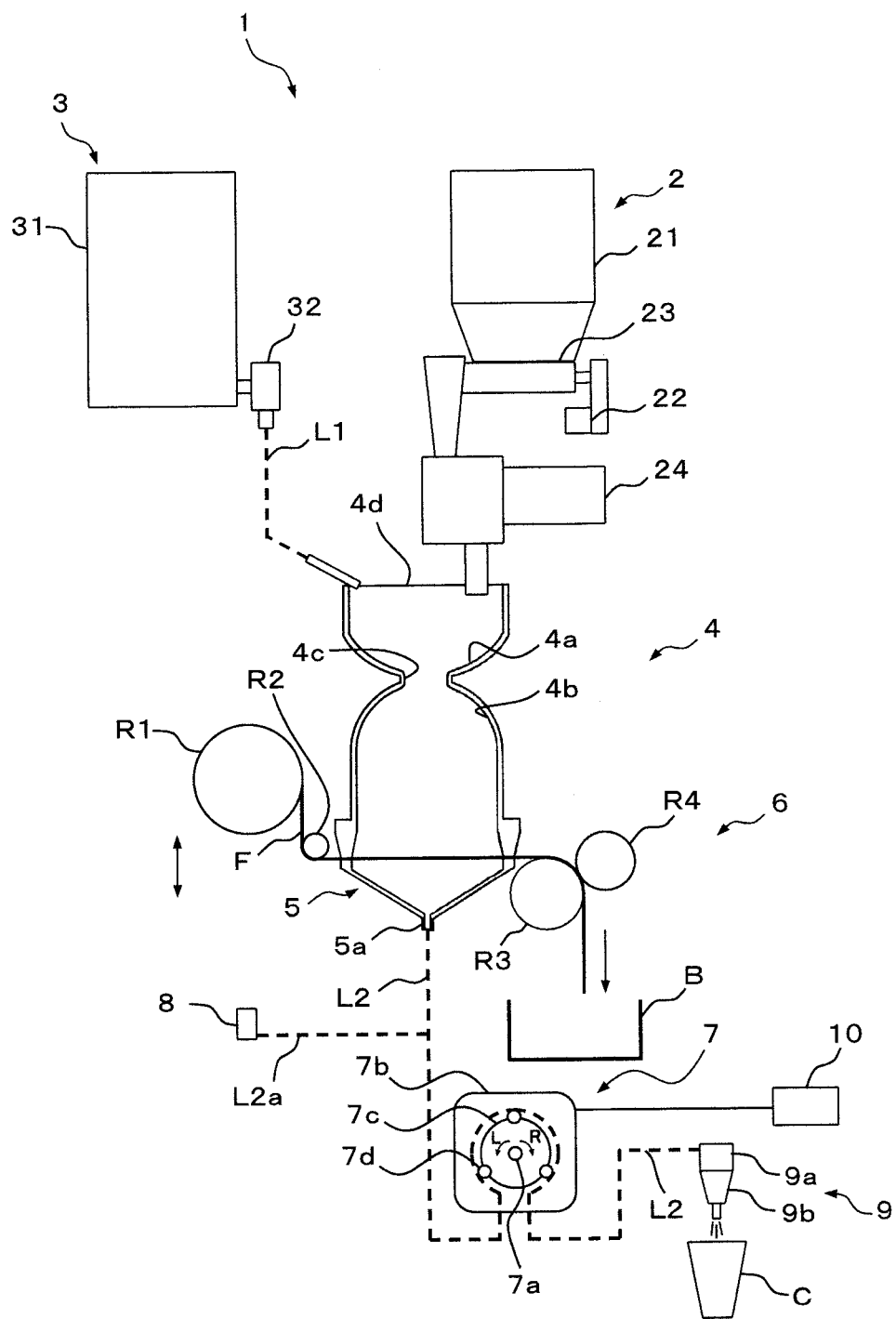
FIG. 1 is a schematic configuration diagram illustrating a beverage dispenser according to a first embodiment of the present invention.
Figure 2:
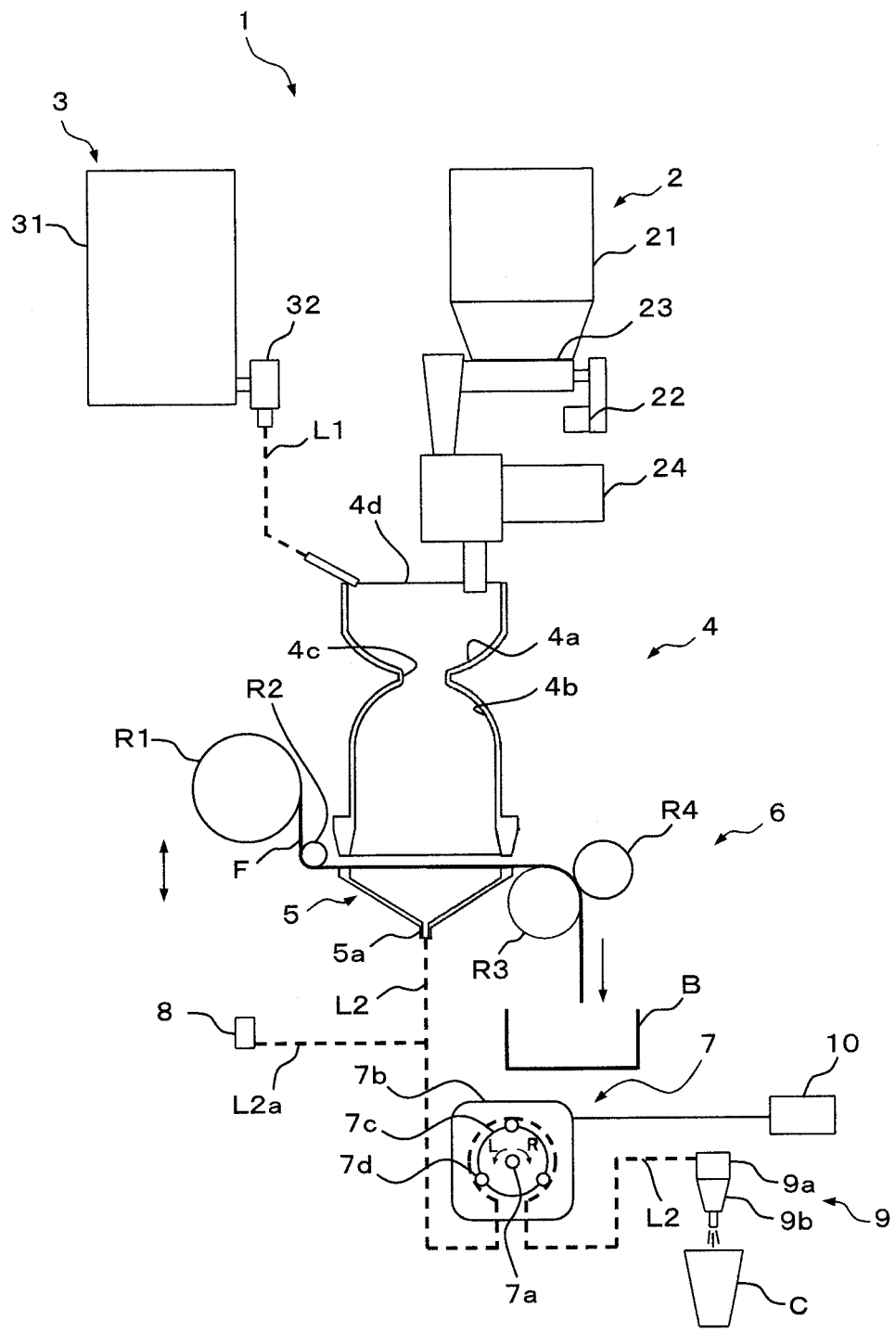
FIG. 2 is a schematic configuration diagram for explaining the state of the beverage dispenser during conveying of a filter according to the first embodiment.

FIG. 1 is a schematic configuration diagram for a beverage dispenser 1 according to a first embodiment of the present invention, and FIG. 2 is a schematic configuration diagram for explaining the state of the beverage dispenser 1 during conveying of a filter F that will be described later.

The beverage dispenser 1 will now be described for a case in which the beverage dispenser 1 is employed by being incorporated in a cup-serving coffee server that employs, as a raw material, ground coffee obtained by grinding coffee beans using a grinder 24, which will be described later, and that brews regular coffee using the raw material, and pours the obtained coffee liquid (regular coffee) into a cup C to serve for a user.

The beverage dispenser 1 includes: a raw material supply unit 2 for supplying a raw material of a beverage; a hot water supply unit 3 for supplying hot water; a cylindrical brewing chamber 4 to which the raw material and hot water are to be supplied; a fluid receptacle 5 arranged below the brewing chamber 4 through a filter F; a filter conveying mechanism 6 for the filter F; a pressure difference generator 7, a pressure sensor 8 for measuring the pressure in the fluid receptacle 5; a buffer unit 9; and a controller 10 for controlling the operation of the entire apparatus. In this embodiment, the beverage dispenser 1 is a negative-pressure suction type apparatus that reduces the pressure in the fluid receptacle 5 as described later.

The raw material supply unit 2 includes a canister 21 in which coffee beans are stored, and the canister 21 is provided with a feeding mechanism 23 that is driven by a raw material motor 22 to feed a predetermined amount of coffee beans. The grinder 24 for grinding coffee beans to produce ground coffee is located below the canister 21. With this arrangement, the raw material supply unit 2 supplies the powdered ground coffee as a raw material to the brewing chamber 4.

The hot water supply unit 3 includes a tank 31 used to heat hot water at a predetermined temperature and keep the water, and a hot water supply path L1 is connected to the tank 31 through a hot water solenoid valve 32. When the hot water solenoid valve 32 is opened, hot water in the tank 31 is supplied along the hot water supply path L1 to the brewing chamber 4.

The brewing chamber 4 is a container, to which the ground coffee and hot water are supplied to brew a coffee liquid, and is formed in a cylindrical shape. The inner capacity of the brewing chamber 4 is defined in accordance with the quantity of the coffee liquid that is to be poured in the standard sized cup C.

Specifically, the brewing chamber 4 has, for example, a substantially cylindrical shape, and a semi-spherical receiving chamber 4a that opens upward is formed as the upper half of the brewing chamber 4, while a semi-spherical mixing chamber 4b that is open downward is formed as the lower half. The receiving chamber 4a and the mixing chamber 4b communicate with each other through a communication portion 4c whose diameter is less than the diameter of the opening of the upper or lower face. The upper face of the receiving chamber 4a is open, and the ground coffee and hot water can be supplied to the receiving chamber 4a through an upper opening 4d.

The filter F is held by being sandwiched between the lower end of the brewing chamber 4 and the upper end of the fluid receptacle 5, and is made of, for example, belt-like paper or synthetic fiber.

The fluid receptacle 5 is a container used to hold the coffee liquid, which has been brewed by supplying the ground coffee and hot water to the brewing chamber 4, and has been forced to drip through the filter F. The fluid receptacle 5 can be moved by a fluid receptacle moving mechanism (not shown), together with the filter conveying mechanism 6, in the vertical direction indicated by a double-headed arrow illustrated in FIG. 1 and FIG. 2. With this arrangement, the filter F can be securely held by being sandwiched between the lower end of the brewing chamber 4 and the upper end of the fluid receptacle 5.

Specifically, the fluid receptacle 5 is, for example, funnel-shaped, and the upper opening is formed in a shape corresponding to the lower opening of the brewing chamber 4, and a pipe 5a of a small diameter is formed at the lower portion of the fluid receptacle 5. A filter support portion (not shown), such as a metal mesh, is arranged on the upper face of the fluid receptacle 5, and supports the filter F and allows passage of the coffee liquid. A beverage path L2 is connected to the pipe 5a of the fluid receptacle 5 to introduce the coffee liquid into the cup C, and the pressure difference generator 7 is connected partway along the beverage path L2. The beverage path L2 is formed by employing a flexible tube, such as a silicone tube.

As described above, for the beverage dispenser 1 in this embodiment, the filter F is arranged between the lower end of the cylindrical brewing chamber 4 and the upper end of the fluid receptacle 5, and the coffee liquid that has been brewed by supplying the ground coffee and hot water to the brewing chamber 4 is forced to drip into the fluid receptacle 5 through the filter F, and thereafter, is delivered to the cup C along the beverage path L2.

The filter conveying mechanism 6 is a device that includes various types of rollers (R1 to R4), and conveys the belt-like filter F in the longitudinal direction. Specifically, the roller R1 around which unused filter F is wound and a guide roller R2 that pulls the filter F from the roller R1 and guides the filter F, are arranged on one side of the fluid receptacle 5. The filter F guided by the guide roller R2 is inserted between the brewing chamber 4 and the fluid receptacle 5. Furthermore, the conveying roller R3 that rotates in the filter conveying direction (a clockwise direction in FIG. 1 and FIG. 2) to convey the filter F and the press roller R4 that presses the filter F against the roller R3, are arranged on the other side of the fluid receptacle 5. A collection box B is located below the conveying roller R3 to collect, for example, the used portion of the filter F conveyed by the conveying roller R3. Conveying of the filter F by the conveying roller R3 is performed after the fluid receptacle 5 has been moved downward by a fluid receptacle moving mechanism (not shown), as illustrated in FIG. 2.

The pressure difference generator 7 generates a pressure difference between the pressure in the brewing chamber 4 and the pressure in the fluid receptacle 5 to force the coffee liquid to drip into the fluid receptacle 5, and thereafter delivers the coffee liquid to the cup C.

In this embodiment, the pressure difference generator 7 is a pump that is located partway along the beverage path L2, and that reduces the pressure in the fluid receptacle 5 by drawing the air from the fluid receptacle 5 to generate a pressure difference between the pressure in the brewing chamber 4 and the pressure in the fluid receptacle 5, gravitationally feeds the coffee liquid from the brewing chamber 4 to the fluid receptacle 5 in accordance with the pressure difference, and delivers the coffee liquid to the cup C by suction. For the description of this embodiment, a case in which a tube pump is employed as an example pump is applied.

Specifically, the pressure difference generator 7 that is a tube pump can be operated by selectively switching between a drip-brewing and delivering operation (suction delivering operation), in which the coffee liquid in the brewing chamber 4 is forced to drip into the fluid receptacle 5, and the filtered coffee liquid is delivered to the cup C by suction, and a mixing operation in which air is supplied to the fluid receptacle 5 and is introduced into the brewing chamber 4 through the filter F to cause the mixing action of the ground coffee and the hot water.

More specifically, the pressure difference generator 7 that is a tube pump includes a ring-like pump casing 7b, through which a pump shaft 7a passes the center. A rotary disc 7c fitted over the pump shaft 7a is rotatably arranged in the pump casing 7b, and a tube (one part of the beverage path L2) is inserted between the inner wall of the pump casing 7b and the rotary disc 7c. On the outer circumference of the rotary disc 7c, an appropriate number (e.g., three) of tube rollers 7d for pressing down the tube are arranged at appropriate locations at the same intervals in the circumferential direction. The pressure difference generator 7 provides a pump function, whereby, during rotation of the rotary disc 7c, the tube rollers 7d press down the tube to block the inside of the tube, and change the blockage positions in the longitudinal direction of the tube, so that the coffee liquid or the air enclosed in the tube between the two adjacent tube rollers 7d is forced out.

The mixing operation and the drip-brewing and delivering operation performed by the pressure difference generator 7, described above, will be described later in detail.

The pressure sensor 8 is a common sensor that measures a pressure, and in this embodiment, is arranged to measure the pressure in the fluid receptacle 5.

The pressure sensor 8 is connected to, for example, a branch path L2a that is a branch of the beverage path L2 extended from the fluid receptacle 5 to the pressure difference generator 7. The pressure sensor 8 outputs a measurement signal indicating the value of measured pressure P. This measurement signal is transmitted to the controller 10 at predetermined sampling time intervals, and is employed to perform the control for halting the drip-brewing and delivering operation of the pressure difference generator 7.

To accurately detect pressure fluctuations, the sampling time interval should be shortened as much as possible. However, since an abnormal value might be included due to noise suddenly generated by an external apparatus, such as a motor, there is a possibility that, when using raw data of the measurement signal that might include the abnormal value, the controller 10 cannot appropriately halt the pressure difference generator 7. Therefore, in this embodiment, a filtering process, such as calculation of a moving average, is performed for the raw data for the measurement signal, and the resultant measurement signal obtained by the filtering process is transmitted to the controller 10 as a pressure measurement signal obtained by the pressure sensor 8. As a result, the tendency for increasing or reducing the measured pressure P is more easily obtained, and external noise is removed.

The buffer unit 9 is connected to the downstream end (the cup C side end) of the beverage path L2 to accept the coffee liquid, and the coffee liquid received in the buffer unit 9 is poured to the cup C at the end. The buffer unit 9 is formed like a cylinder that opens upward and downward, and includes an upper large-diameter portion 9a and a lower small-diameter portion 9b, which is formed like a funnel. An inlet is formed on the side of the large-diameter portion 9a in the tangential direction, and the end of the tube (L2) is connected to the inlet.

The controller 10 controls the operation of the entire apparatus, and specifically, controls driving of the raw material motor 22, a drive motor (not shown) for the grinder 24, the hot water solenoid valve 32, a drive motor (not shown) for the conveying roller R3, a pump motor (not shown) for the pressure difference generator 7 and the fluid receptacle moving mechanism (not shown). The controller 10 receives, from the pressure sensor 8, a measurement signal obtained by the filtering process, and halts the pressure difference generator 7 based on the value of the measurement signal to complete the supply of the coffee liquid to the cup C. Furthermore, although not shown, a selection switch is provided on the front face of the main body of the apparatus to allow a user to select the size of the cup C. The controller 10 receives, from the selection switch, a signal to identify the cup size.

A period of time required from driving of the raw material motor 22 and the grinder 24 until supplying of a predetermined necessary amount of ground coffee to serve a volume of coffee liquid that corresponds to each cup size (e.g., 10 g of ground coffee in case of a standard sized cup or 20 g of ground coffee in case of a large sized cup) is set in advance to the controller 10. Furthermore, a period of time required from opening of the hot water solenoid valve 32 until supplying of an appropriate amount of hot water for serving a volume of coffee liquid corresponding to each cup size is also set in advance to the controller 10.

The overview of the operation of the entire beverage dispenser 1 in this embodiment will now be described, with reference to FIG. 1 to FIG. 3. As for the operation of the controller 10 for stopping the drip-brewing and delivering operation of the pressure difference generator 7, the outline of the operation will be described here, and a detailed explanation therefor will be given later.

As illustrated in FIG. 2, the fluid receptacle 5 in the standby state is located at a lower position, separated from the brewing chamber 4. When a user, etc., selects the size for the cup C by using the selection switch (not shown), an identification signal indicating that the cup C of a predetermined size has been selected is transmitted from the selection switch to the controller 10. Upon receiving the identification signal, the controller 10 generates an operation start signal, and at first, transmits the operation start signal to the fluid receptacle moving mechanism to move the fluid receptacle 5 to an upper position, so that the state in which the filter F is held by being sandwiched by the fluid receptacle 5 and the brewing chamber 4 is provided. Thereafter, the controller 10 outputs the operation start signal to the hot water solenoid valve 32, the raw material motor 22 and the grinder 24.

Figure 3:
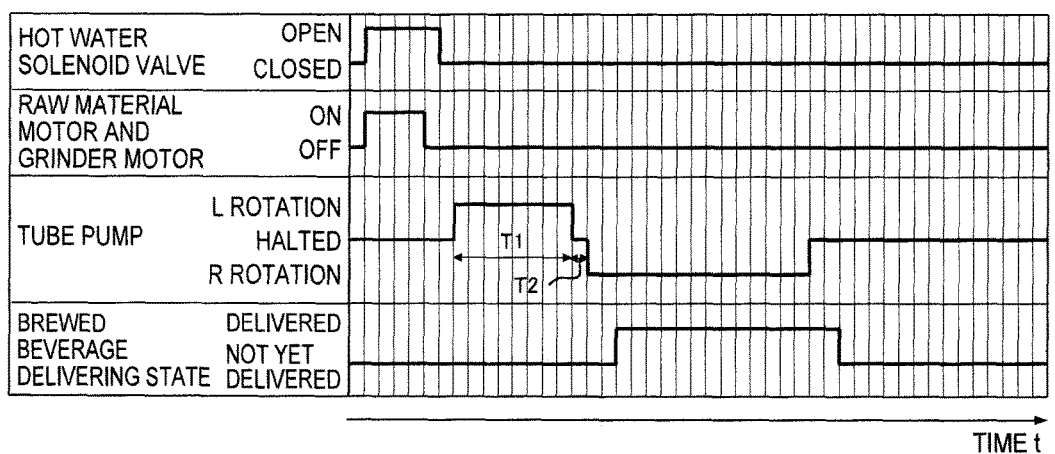
FIG. 3 is a timing chart of the beverage brewing processing performed by the beverage dispenser according to the embodiment in a case in which beverage is to be delivered to a standard (regular) sized cup.

As illustrated in FIG. 3, based on the operation start signal received from the controller 10, the hot water solenoid valve 32 is opened, and also, the raw material motor 22 and the drive motor for the grinder 24 are activated (ON). Thus, hot water in the tank 31 is introduced into the brewing chamber 4, and at the same time, coffee beans in the canister 21 are supplied to, and ground by the grinder 24, and the obtained ground coffee is fed to the brewing chamber 4. Thereafter, the ground coffee and the hot water are mixed in the brewing chamber 4 above the filter F. In this case, when the controller 10 has output the operation start signal to the raw material motor 22 and the drive motor for the grinder 24, and, for example, a preset time period required for supplying the amount of ground coffee corresponding to the selected cup size has elapsed, the controller 10 stops the raw material motor 22 and the drive motor for the grinder 24 (OFF). As a result, a proper amount of ground coffee is supplied to the brewing chamber 4. Furthermore, when a preset time period required for supplying hot water corresponding to the capacity of the selected cup size has elapsed since the hot water solenoid valve 32 was open, the controller 10 closes the hot water solenoid valve 32.

When a predetermined period of time has elapsed since the hot water solenoid valve 32 was closed, the controller 10 drives the pump motor of the pressure difference generator 7 to rotate the pump shaft 7a in a direction indicated by an arrow L in FIG. 1, and starts the mixing operation.

Specifically, when the pump shaft 7a is rotated in the direction indicated by the arrow L, the pressure difference generator 7 pressurizes the fluid receptacle 5 by drawing air through the downstream opening of the beverage path L2, and introduces the pressurized air from the fluid receptacle 5 through the filter F to the brewing chamber 4 to cause mixing of the ground coffee with the hot water in the brewing chamber 4. Since the pressurized air passes the filter F and rises as air bubbles in the fluid mixture in the brewing chamber 4, and the air bubbles promote mixing of the coffee ground and hot water, brewing of the coffee liquid can be performed in a short period of time. The controller 10 permits the pressure difference generator 7 to continue the mixing operation (rotation in the direction L) during a preset time period T1, and when the time period T1 has elapsed, stops the pressure difference generator 7 to halt the mixing operation.

Furthermore, when a preset time period T2, for example, has elapsed since the mixing operation of the pressure difference generator 7 was halted, the controller 10 permits the pressure difference generator 7 to start the drip-brewing and delivering operation for a coffee liquid. Specifically, when the pump shaft 7a is rotated in a direction indicated by an arrow R in FIG. 1, the pressure difference generator 7 reduces the pressure in the fluid receptacle 5 by drawing air from the fluid receptacle 5. As a result, the pressure in the fluid receptacle 5 becomes lower than the atmospheric pressure, and of the fluid mixture in the brewing chamber 4, the coffee grounds are captured by the filter F, and only the coffee liquid drips through the filter F into the fluid receptacle 5. The coffee liquid that has dripped into the fluid receptacle 5 is introduced into the pressure difference generator 7 by suction, and is fed from the pressure difference generator 7 to the buffer unit 9. The coffee liquid thus received by the buffer unit 9 is delivered from the buffer unit 9 and is poured into the cup C. As illustrated in FIG. 3, there is actually a time lag between the start of the rotation of the pressure difference generator 7 in the direction of R and the delivering of the coffee liquid into the cup C. Furthermore, based on the value of a measurement signal received from the pressure sensor 8, for example, the controller 10 halts the drip-brewing and delivering operation for the pressure difference generator 7, and completes feeding of the coffee liquid to the standard sized cup C. Thereafter, the controller 10 employs the fluid receptacle moving mechanism to move the fluid receptacle 5 to the lower position. As a result, the beverage dispenser 1 is set to the standby state.

The control operation for halting the drip-brewing and delivering operation of the pressure difference generator 7 will now be described in detail, with reference to FIG. 4 and FIG. 5.

Figure 4:
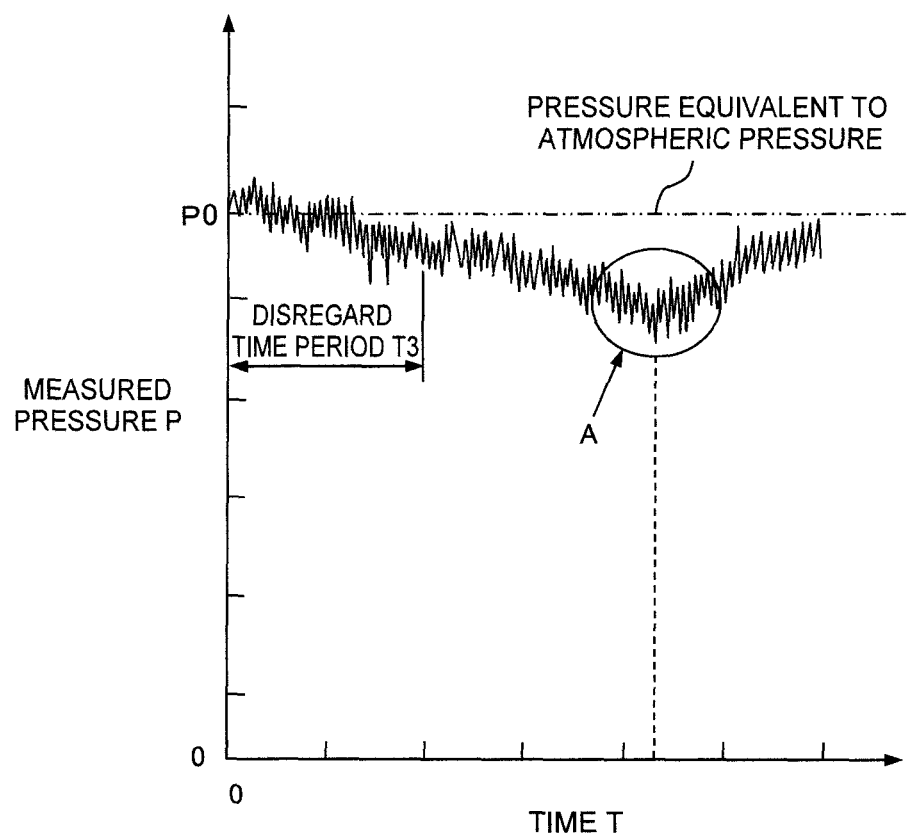
FIG. 4 is a diagram illustrating an example of fluctuations of pressure in the fluid receptacle of the beverage dispenser according to the embodiment.
Figure 5:
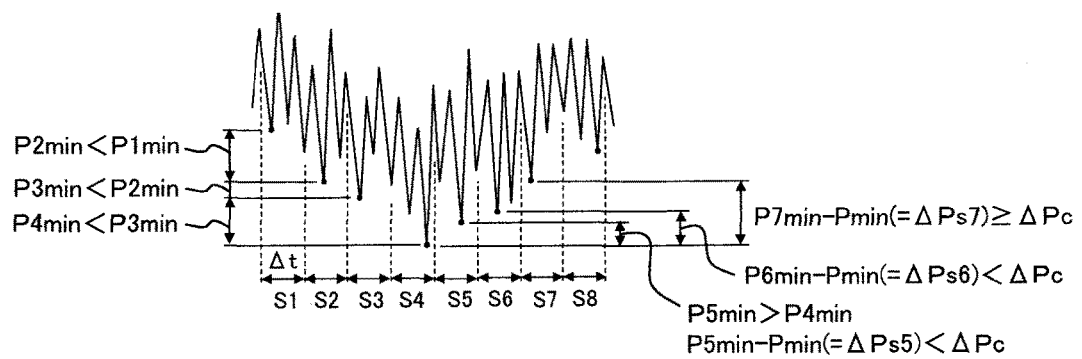
FIG. 5 is an enlarged diagram of a portion A in FIG. 4, for explaining a timing to halt a tube pump.

FIG. 4 is a diagram illustrating fluctuations of the pressure P of the fluid receptacle 5 measured by the pressure sensor 8 by employing the start time of the drip-brewing and delivering operation as a start point of time T, and FIG. 5 is an enlarged diagram illustrating a portion A in FIG. 4.

In this embodiment, as described above, the filtering process, such as calculation of a moving average, is performed for raw data of the measurement signal that indicates the measured pressure P, and the resultant measurement signal obtained by the filtering process is transmitted to the controller 10 as a measurement signal for the measured pressure P obtained by the pressure sensor 8. Specifically, each value for the measured pressure P that indicates an upward convex point or a downward convex point, relative to another value for the measured pressure P, represents the average value (so-called a moving average) of raw data used for sampling at the pertinent convex point and an appropriate number of sets of raw data at preceding (earlier in time) points of the convex point. Thus, the tendency of increase or decrease of the measured pressure can be easily obtained, and external noise can be removed. The diagrams in FIG. 4, FIG. 5 and FIG. 8 that will be referred to later illustrate the fluctuations of the measured pressure after the filtering process has been performed, and the measured pressure P before the filtering process is performed, fluctuates more greatly than the measured pressure illustrated in FIG. 4, FIG. 5 and FIG. 8. Furthermore, the number of sets of raw data for the measured pressure before the filtering process is performed, is greater than the number of data sets illustrated in FIG. 4, FIG. 5 and FIG. 8, and the measured pressure fluctuates more rapidly.

For the negative-pressure suction type beverage dispenser 1, as illustrated in FIG. 4, the pressure in the fluid receptacle 5 tends to be reduced during the drip-brewing and delivering operation of the pressure difference generator 7; however, when the coffee liquid is exhausted in the brewing chamber 4, the air in the brewing chamber 4 passes the filter F and is introduced into the fluid receptacle 5 by suction, and the suction load resistance is decreased, so that the pressure in the fluid receptacle 5 starts to be increased up to the level near the atmospheric pressure. Furthermore, as illustrated in FIG. 4, the measured pressure P even after the filtering process has been performed rapidly and vertically fluctuates. Generally, the pressure in the fluid receptacle 5 is reduced during the drip-brewing and delivering operation, but there is a case, as illustrated in FIG. 4, in which, immediately after the drip-brewing and delivering operation has started (near T=0), an unstable pressure period is present, in which the pressure in the fluid receptacle 5 goes beyond the atmospheric pressure P0. Therefore, there is a case in which halting of the pressure difference generator 7 at an appropriate timing is difficult merely by providing a threshold value for pressure and comparing the measured pressure P with the threshold value.

Therefore, as illustrated in FIG. 5, the controller 10 in this embodiment sequentially determines, for individual intervals of a preset time length Δt (S1 to S8 in a range illustrated in FIG. 5), an interval average (an interval representative value) of a plurality of values for the pressure P measured by the pressure sensor 8, and based on the results of comparison of the individual interval averages, stops the drip-brewing and delivering operation for a coffee liquid performed by the pressure difference generator 7. The controller 10 employs, for example, the results of comparison of the interval averages for the adjacent intervals to control halting of the drip-brewing and delivering operation.

Specifically, in a case in which an interval average Pn for an interval Sn at a predetermined position is greater than an interval average Pn−1 for a preceding interval Sn−1 that is positioned before the interval Sn (earlier in time) and adjacent to the interval Sn, the controller 10 regards, as the minimum interval average Pmin, the interval average Pn−1 for the preceding interval Sn−1, and halts the drip-brewing and delivering operation of the pressure difference generator 7 when the interval averages for a predetermined number of intervals (including the interval Sn) that follow the preceding interval Sn−1 are greater than the minimum interval average Pmin, by an amount equal to or greater than a preset threshold value ΔPc. That is, when values obtained by subtracting the minimum interval average Pmin from individual interval averages for a predetermined number of intervals (including the internal Sn) are equal to or greater than the threshold value ΔPc, the controller 10 halts the drip-brewing and delivering operation of the pressure difference generator 7.

Furthermore, as illustrated in FIG. 4, when a preset time period T3 has elapsed since the pressure difference generator 7 started the drip-brewing and delivering operation for a coffee liquid, the controller 10 starts to halt the drip-brewing and delivering operation based on the results of comparison of the individual interval averages. That is, after the drip-brewing and delivering operation of the pressure difference generator 7 has started, a disregard time period (T3) is provided, during which measurement signals transmitted by the pressure sensor 8 are disregarded, and during this period, the pressure difference generator 7 is forced to be driven.

More specifically, the interval average Pn is the minimum value among a plurality of values for the measured pressure P obtained in this interval after the filtering process has been performed. When the range in FIG. 5 after the elapse of the time period T3 is employed as an example, a plurality of values for the measured pressure P obtained by the filtering process are entered for the intervals S1 to S8 at a predetermined sampling time interval, and the minimum values for these intervals S1 to S8 are P1min to P8min, respectively. The controller 10 detects that, for example, the minimum value P2min for the interval S2, which follows the interval S1 and is adjacent to the interval S1, is less than the minimum value P1min for the interval S1, and sequentially detects that the minimum value P3min for the interval S3 is less than the minimum value P2min for the interval S2, and that the minimum value P4min for the interval S4 is less than the minimum value P3min for the interval S3. Furthermore, the controller 10 detects that the minimum value P5min for the interval S5 is greater than the minimum value P4min for the interval S4. In this case, the controller 10 stores the minimum value P4min as the minimum interval average Pmin for all of the intervals, and determines that, at the timing of determining the minimum interval average Pmin, the fluctuation tendency of the pressure in the fluid receptacle 5 is changed (altered) from the tendency of decrease to the tendency of increase.

Thereafter, the controller 10 detects that a value ΔPs5 obtained by subtracting the minimum interval average Pmin (=P4min) from the minimum value P5min for the interval S5 is less than the threshold value ΔPc, and also detects that a value ΔPs6 obtained by subtracting the minimum interval average Pmin from the minimum value P6min for the interval S6 is less than the threshold value ΔPc. Furthermore, the controller 10 detects that a value ΔPs7 obtained by subtracting the minimum interval average Pmin from the minimum value P7min for the interval S7 is equal to or greater than the threshold value ΔPc, and at this time, halts the drip-brewing and delivering operation of the pressure difference generator 7. The pressure difference generator 7 is not halted in the interval S5, at which the fluctuation tendency of the pressure in the fluid receptacle 5 is changed from the tendency to reduce to the tendency to increase, because an extra waiting period is to be obtained to completely remove the coffee liquid from the brewing chamber 4 and the tube (the beverage path L2). As illustrated in FIG. 4, there is a time lag since the rotation of the pressure difference generator 7 in the direction R was halted until the pouring of the coffee liquid into the cup C is actually halted.

According to the beverage dispenser 1 of this embodiment, the filter F is arranged between the lower end of the cylindrical brewing chamber 4 and the upper end of the fluid receptacle 5, the pressure difference generator 7 generates a pressure difference between the pressure of the brewing chamber 4 and the pressure in the fluid receptacle 5 to force the coffee liquid to drip from the brewing chamber 4 into the fluid receptacle 5, and delivers the coffee liquid to the cup C. Furthermore, the controller 10 sequentially determines, for the individual intervals of the preset time length Δt, the interval average of a plurality of values for the pressure P measured by the pressure sensor 8 that measured the pressure in the fluid receptacle 5, and based on the results of comparison of the individual interval averages, halts the beverage drip-brewing and delivering operation of the pressure difference generator 7.

As described above, the interval average of a plurality of values for the measured pressure P obtained in one interval can be determined for each interval, and the interval averages can be employed to halt the drip-brewing and delivering operation of the pressure difference generator 7. Therefore, even when the pressure in the fluid receptacle 5 rapidly fluctuates by repeating the increase and decrease, change from the tendency to reduce the pressure to the tendency to increase can be more accurately obtained, without being adversely affected by the rapid fluctuations. Accordingly, the pressure difference generator 7 can be halted at an appropriate timing.

Thus, the negative-pressure suction type beverage dispenser capable of halting the pressure difference generator 7 at an appropriate timing in the situation in which the pressure in the fluid receptacle rapidly fluctuates, can be provided.

Furthermore, in this embodiment, the controller 10 halts the drip-brewing and delivering operation of the pressure difference generator 7 when the interval averages for a predetermined number of intervals that follow the preceding interval Sn−1, for which the minimum interval average Pmin is determined, are greater than the minimum interval average Pmin, by an amount equal to or greater than the preset threshold value ΔPc.

With this arrangement, in a case in which the tube pump is employed as the pressure difference generator 7 and in which the pressure in the fluid receptacle 5 rapidly fluctuates, change from the tendency to reduce the pressure in the fluid receptacle 5 to the tendency to increase can be accurately detected, and a waiting period can be obtained after the fluctuation tendency of the pressure has changed to the tendency to increase and before the pressure difference generator 7 is halted. As a result, when the coffee liquid in the brewing chamber 4 has been completely drawn by suction, the pressure difference generator 7 can be halted, and the operation can be smoothly shifted to the succeeding control operation, such as the above described standby control for shifting the fluid receptacle 5 to the lower position.

Moreover, in this embodiment, when the preset time period T3 has elapsed from the start of the coffee drip-brewing and delivering operation of the pressure difference generator 7, the control for halting the drip-brewing and delivering operation is started based on the results of comparison of the individual interval averages.

With this arrangement, even in a case in which, immediately after the drip-brewing and delivering operation is started, an unstable period is present in which the pressure in the fluid receptacle 5 goes beyond the atmospheric pressure P0, the disregard time period (T3) in which the measurement signal transmitted by the pressure sensor 8 is disregarded is prepared after the drip-brewing and delivering operation of the pressure difference generator 7 has begun. Therefore, during this period, the pressure difference generator 7 can be forcibly driven.

Moreover, in this embodiment, after a predetermined amount of raw material and a predetermined volume of hot water are supplied to the brewing chamber 4, mixing of the raw material and hot water is performed by the pressure difference generator 7 that is a tube pump, and when the predetermined time period T2 has elapsed since the mixing operation was halted, the drip-brewing and delivering operation by the pressure difference generator 7 is started.

According to this arrangement, the waiting period can be provided in which, after the mixing operation is halted, the raw material floating in the fluid mixture in the brewing chamber 4 by the mixing operation of the pressure difference generator 7 can be appropriately settled down on the filter F side. Therefore, a phenomenon that hot water passes the filter F without contacting the raw material can be properly prevented. Therefore, the raw material can appropriately contact the hot water, and the raw material can be efficiently employed for brewing, without any waste.

An example in which the tube pump serves as a pump for the pressure difference generator 7 has been employed in the description; however, the pump (the pressure difference generator 7) is not limited to this type. So long as the pump (the pressure difference generator 7) has a function that reduces the pressure in the fluid receptacle 5 by drawing air from the fluid receptacle 5, and generates a pressure difference between the pressure in the brewing chamber 4 and the pressure in the fluid receptacle 5, and that in accordance with the pressure difference, forces the coffee liquid to drip from the brewing chamber 4 into the fluid receptacle 5, and delivers the coffee liquid to the cup C by suction, any type of pump can be employed, and a vane pump, for example, may be employed.

Modifications of First Embodiment

Modifications (modification 1 to modification 5) for the control executed by the negative-pressure suction type beverage dispenser 1 of this embodiment to halt the drip-brewing and delivering operation will now be described.

In the above embodiment, the controller 10 determines the minimum interval average Pmin, and halts the drip-brewing and delivering operation when a condition in which (the interval average)−(the minimum interval average Pmin) ≥(the threshold value ΔPc) is established (example configuration 1). However, the configuration is not limited thereto.

As another example configuration, the drip-brewing and delivering operation of the pressure difference generator 7 may be halted when the minimum interval average Pmin is determined, and when the individual interval averages for a predetermined number of intervals that follow the preceding interval, for which the minimum interval average Pmin has been determined, are sequentially greater than the minimum interval average Pmin (modification 1), or the drip-brewing and delivering operation of the pressure difference generator 7 may be halted when a predetermined period set in advance has elapsed from the determination time at which the minimum interval average Pmin was determined (modification 2).

Modification 1 will be described by, for example, setting two as a number of intervals that sequentially follow the preceding interval (i.e., setting two as the number of times at which the interval averages are sequentially greater than the minimum interval average Pmin) and by employing the case in FIG. 5 as an example. The interval for which the minimum interval average Pmin is determined is the interval S4, and it is determined that the interval averages (P5min and P6min) for the two intervals that succeed the interval S4, i.e., the interval S5 and the interval S6, are greater than the minimum interval average Pmin, and thereafter, the drip-brewing and delivering operation is halted in the interval S6. It should be noted that the number of times at which the interval averages are sequentially greater is not limited to two, and any number of times can be set.

For the configuration of modification 2, a preset period from the determination time to halt the operation can be changed, as needed.

Furthermore, in the embodiment (example configuration 1) and modifications 1 and 2, the controller 10 determines the minimum interval average Pmin, and employs the minimum interval average Pmin as a reference for comparison with the succeeding interval averages. However, the configuration is not limited thereto.

As another example configuration, the controller 10 may halt the drip-brewing and delivering operation of the pressure difference generator 7 when it is detected, sequentially by a predetermined number of times (N), that regardless of the minimum interval average Pmin, the interval average Pn for a specific interval Sn is greater than the interval average Pn−1 for the preceding interval Sn−1 that is earlier than and adjacent to the interval Sn (modification 3), or the controller 10 may halt the drip-brewing and delivering operation of the pressure difference generator 7 when the interval average Pn+m−1 for the latest interval Sn+m−1 of a predetermined number of intervals is greater than the interval average Pn for the earliest interval Sn by an amount equal to or greater than the preset threshold value ΔPc (modification 4). In case of modifications 3 and 4, the minimum interval average Pmin need not be determined.

Modification 3 will be described by employing a case in which the number of sequential times N is set to, for example, two. In this case, the total of three sequential intervals, Sn, Sn+1 and Sn+2, are included in an interval group used for comparison, and in a case in which a condition of Pn<Pn+1<Pn+2 is established for the three intervals, the drip-brewing and delivering operation is halted in the interval Sn+2. In a case in which the condition of Pn<Pn+1<Pn+2 is not established, the next group of three intervals, Sn+1, Sn+2 and Sn+3, or Sn+2, Sn+3 and Sn+4, may be set by partially overlapping the preceding group of the three intervals Sn, Sn+1 and Sn+2, or intervals Sn+3, Sn+4 and Sn+5 may be set without overlapping the preceding group of three intervals. Determination is performed as to whether a condition of Pn+1<Pn+2<Pn+3, a condition of Pn+2<Pn+3<Pn+4, or a condition of Pn+3<Pn+4<Pn+5, is established for the next group of three intervals, and when the condition is established, the drip-brewing and delivering operation is halted in the latest interval. In a case in which the condition is not established, the shifting to the next three intervals and the comparing of the values are repeated in the same manner until the condition is established. It should be noted that the number of sequential times N is not limited to two and any number of times can be appropriately set, and the number of intervals employed may be equal to or greater than three.

Modification 4 will be described by employing a case in which the number of sequential intervals m is set to, for example, three. In this case, the total of three intervals Sn, Sn+1 and Sn+2 may be set as a group of intervals used for comparison, and in a case in which a condition of Pn+2−Pn≥ΔPc is established, the drip-brewing and delivering operation is halted in the interval Sn+2. In a case in which the condition of Pn+2−Pn<ΔPc is established, the next group of three intervals may be set in the same manner as in modification 3 by partially overlapping the preceding group of the three intervals Sn, Sn+1 and Sn+2, or without overlapping the preceding group. Then, whether a condition is established for the next group of three intervals is determined again, and shifting to the following three intervals and comparing of the values are repeated until the condition is established. It should be noted that the number m of intervals is not limited to three, and any number of intervals, such as two intervals or four or more intervals, can be set.

Furthermore, in the embodiment (example configuration 1), the controller 10 halts the drip-brewing and delivering operation based on the results obtained by directly comparing the interval averages for the intervals adjacent to each other; however, the configuration is not limited thereto. The moving average Pnm that represents the mean of the interval average Pn for the interval Sn and the interval averages for a predetermined number m of intervals that precede the interval Sn may be calculated sequentially for the individual intervals Sn, and when the moving average Pnm obtained for each interval Sn is greater than the moving average P(n−1)n obtained for the preceding interval Sn−1 that is earlier than and is adjacent to the interval Sn, the drip-brewing and delivering operation for the coffee liquid performed by the pressure difference generator 7 may be halted (modification 5).

In the embodiment (example configuration 1), the controller 10 receives a measurement signal, indicating measured pressure obtained by performing the moving average processing for the raw data for the pressure measured by the pressure sensor 8. Whereas, in modification 5, the moving average processing is performed also for the interval average Pn, and the interval average obtained by the moving average processing is regarded as the moving average Pnm, and halting of the drip-brewing and delivering operation is performed by employing the moving average Pnm.

Second Embodiment

Figure 6:
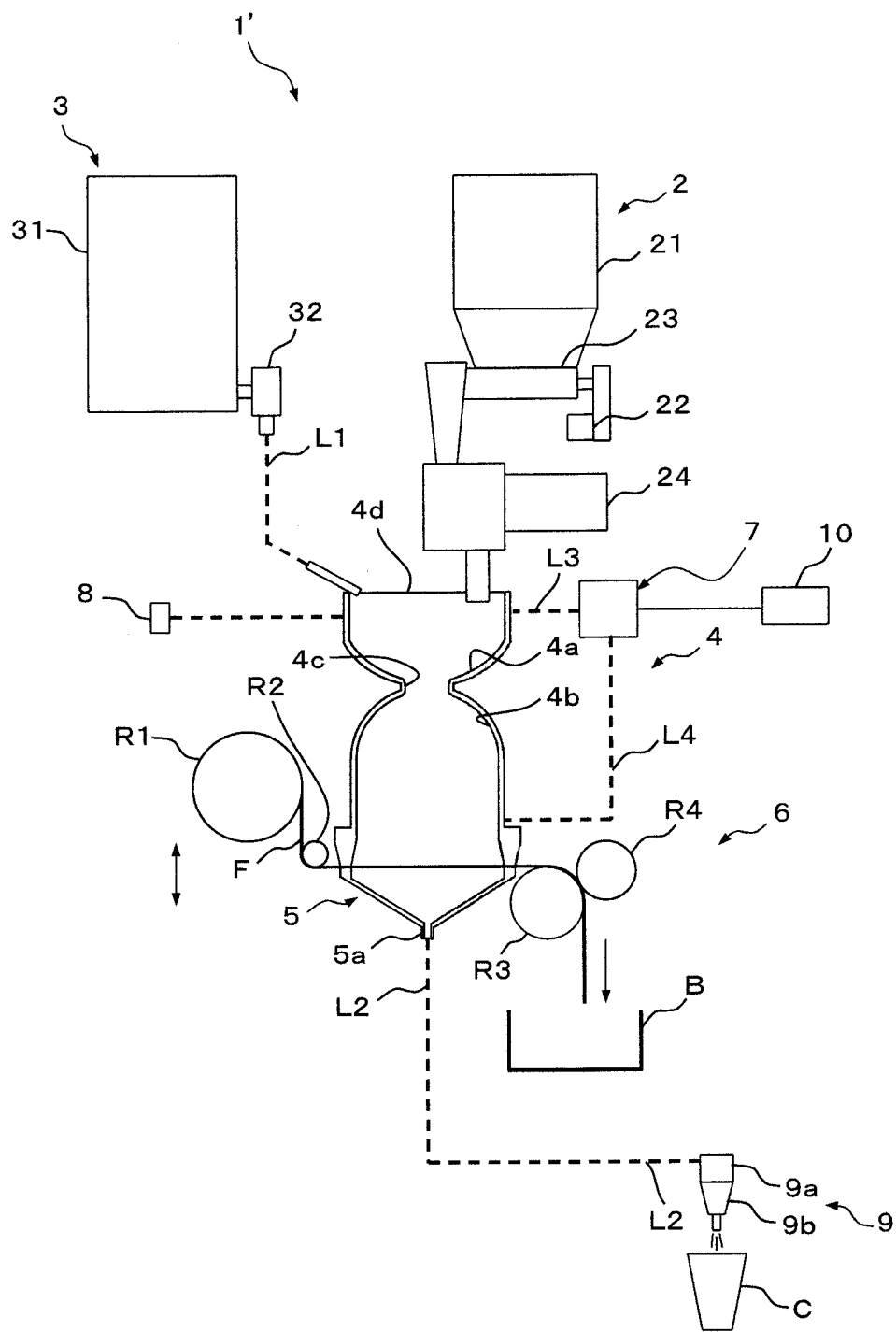
FIG. 6 is a schematic configuration diagram illustrating a beverage dispenser according to a second embodiment of the present invention.
Figure 7:
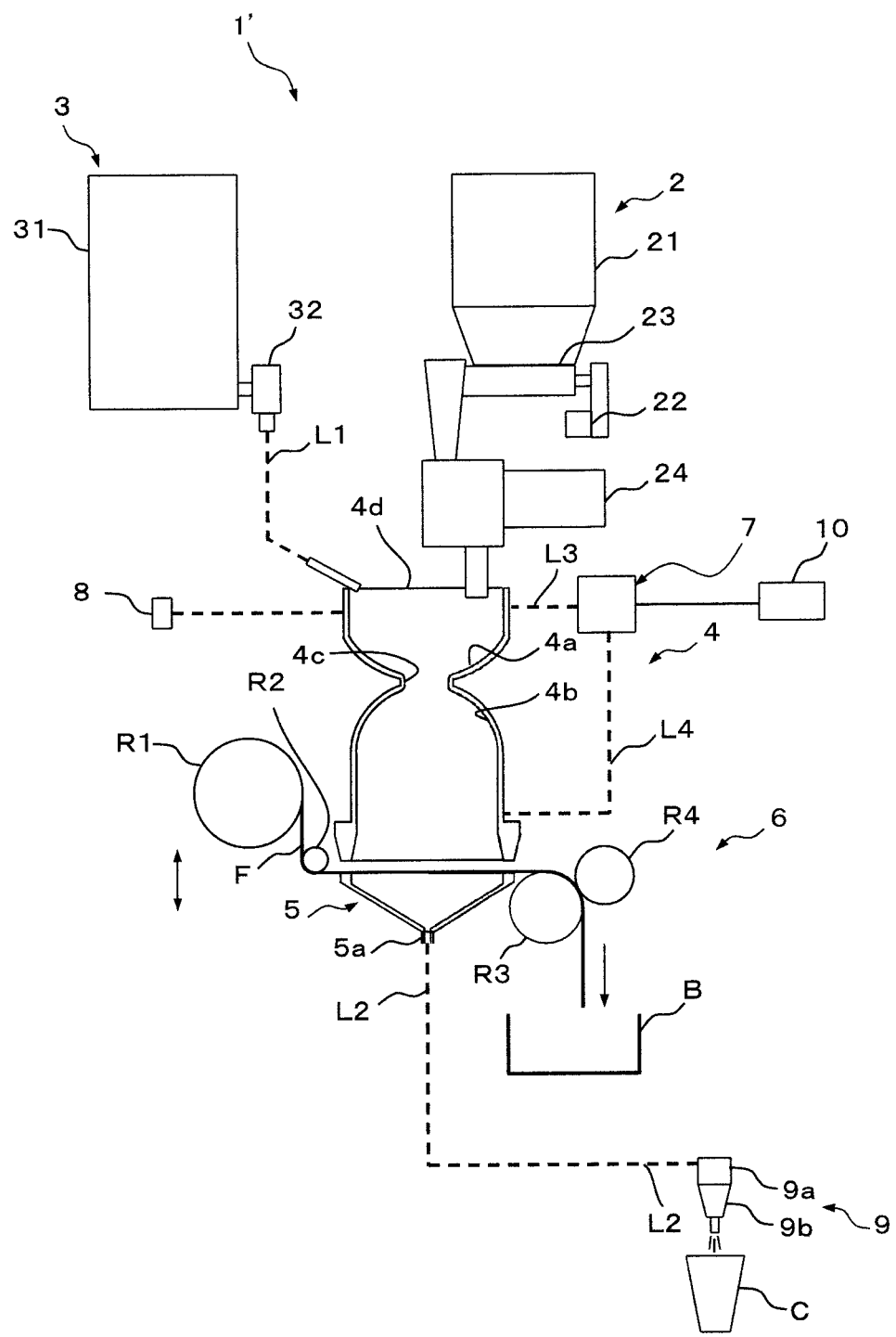
FIG. 7 is a schematic configuration diagram for explaining the state of the beverage dispenser during conveying of a filter according to the second embodiment.

FIG. 6 is a schematic configuration diagram of a beverage dispenser 1' according to a second embodiment of the present invention, and FIG. 7 is a schematic configuration diagram for explaining the state of the beverage dispenser 1' during conveying of a filter F. The components identical to those of the beverage dispenser 1 of the first embodiment (example configuration 1) will not be described by providing the same numerals for those components, and only different portions will be explained briefly.

The beverage dispenser 1' of this embodiment is a pressurization type apparatus that applies pressure to the inside of a brewing chamber 4 to gravitationally feed a coffee liquid to a fluid receptacle 5.

In this embodiment, a pressure sensor 8 is connected to, for example, a receiving chamber 4a of the brewing chamber 4 so as to enable measurement of the pressure in the brewing chamber 4. Although not shown, a closable lid that can cover an upper opening 4d of a receiving chamber 4a. The closable lid is employed to open the upper opening 4d during, for example, the waiting period, the period for supplying raw material and hot water, or the mixing period, and to cover the upper opening 4d during the suction delivering operation of a pressure difference generator 7. In order to open or close the closable lid, a controller 10 outputs, for example, a drive signal at an appropriate timing to a closable-lid opening and closing mechanism (not shown) that opens or closes the closable lid.

Furthermore, the pressure difference generator 7 in this embodiment is an air pump that pressurizes the brewing chamber 4 by supplying compressed air to the brewing chamber 4 to generate a pressure difference between the pressure in the brewing chamber 4 and the pressure in the fluid receptacle 5, and employs the pressure difference to gravitationally feed the coffee liquid from the brewing chamber 4 to the fluid receptacle 5, and to deliver the coffee liquid to a cup C along a beverage path L2.

For example, an air supply path L3 for applying pressure is connected to the receiving chamber 4a of the brewing chamber 4, and an air supply path L4 for mixing is connected to a mixing chamber 4b of the brewing chamber 4. Although not shown, solenoid valves are located on the air supply paths L3 and L4. In the standby state, the solenoid valves are closed, while during the mixing operation, the solenoid valve for the air supply path L4 is open, and air is supplied from the pressure difference generator 7 to the brewing chamber 4 along the air supply path L4. Whereas, during the drip-brewing and delivering operation, the solenoid valve for the air supply path L3 is open, and air is supplied from the pressure difference generator 7 to the brewing chamber 4 along the air supply path L3.

The controller 10 in this embodiment performs the control for halting the drip-brewing and delivering operation, in the same manner as for example configuration 1 for the first embodiment, based on the results obtained by comparing interval averages for intervals that are adjacent to each other.

In case of negative-pressure suction type, the pressure fluctuation tendency in the drip-brewing and delivering operation is changed from the tendency to reduce to the tendency to increase, while in case of pressurization type, the pressure fluctuation tendency is changed from the tendency to increase to the tendency to reduce, i.e., the tendency of the pressurization type is opposite to that of the negative-pressure suction type.

That is, in the pressurization type beverage dispenser 1', the pressure in the brewing chamber 4 tends to be increased by the drip-brewing and delivering operation of the pressure difference generator 7, and when the coffee liquid in the brewing chamber 4 is exhausted, the air in the brewing chamber 4 is drawn to the fluid receptacle 5 through the filter F, so that the load resistance is reduced, and the pressure of the brewing chamber 4 starts to be reduced. Therefore, the relationship of the amounts to be compared with regard to the interval averages by the controller 10 is also opposite to that for the first embodiment (example configuration 1).

Specifically, in a case in which an interval average Pn for an interval Sn at a predetermined position is less than an interval average Pn−1 for a preceding interval Sn−1 that is located before the interval Sn (earlier in time) and is adjacent to the interval Sn, the controller 10 regards the interval average Pn−1 for the preceding interval Sn−1 as an maximum interval average Pmax, and when the interval averages for a predetermined number of intervals (including the interval Sn) that follow the preceding interval Sn−1 are less than the maximum interval average Pmax by an amount equal to or less than a preset threshold value ΔPc, i.e., when a condition in which (the maximum interval average Pmax)− (the interval average)≥ΔPc is established, the controller 10 halts the drip-brewing and delivering operation of the pressure difference generator 7.

More specifically, the interval average Pn is the maximum value of a plurality of values for measured pressure P obtained in the interval after the filtering process has been performed.

The outline of the whole operation of the beverage dispenser 1' of the second embodiment will now be described, with reference to FIG. 6 and FIG. 7. It should be noted, however, that the same operation as performed for the first embodiment will be described only briefly.

As illustrated FIG. 7, in the standby state, the fluid receptacle 5 is located at the lower position, and the upper opening 4d of the brewing chamber 4 is open. When a user selects a cup size, the fluid receptacle 5 is moved to the upper position, illustrated in FIG. 6, in accordance with a command issued by the controller 10. In this state, hot water is introduced into the brewing chamber 4, and at the same time, ground coffee is supplied to the brewing chamber 4.

When supply of hot water and ground coffee is completed, the controller 10 drives the pressure difference generator 7 and also opens the solenoid valve on the air supply path L4 to supply air to the brewing chamber 4, allowing the mixing of the ground coffee and hot water in the brewing chamber 4. During a preset time period T1, the controller 10 continues the mixing operation of the pressure difference generator 7, and when the time period T1 has elapsed, halts the pressure difference generator 7 and also closes the solenoid valve disposed partway along the air supply path L4 to stop the mixing operation. When the mixing operation is halted, at the same time the controller 10 outputs a signal to the closable-lid opening and closing mechanism to move the closable lid in a closing direction for covering the upper opening 4d.

Next, when a preset time period T2 has elapsed from the halt of the mixing operation, the controller 10 opens the solenoid valve on the air supply path L3, and permits the pressure difference generator 7 to start the drip-brewing and delivering operation for a coffee liquid. Specifically, the pressure difference generator 7 pressurizes the brewing chamber 4 by supplying air to the receiving chamber 4a of the brewing chamber 4 along the air supply path L3. As a result, the pressure in the brewing chamber 4 becomes higher than the pressure in the fluid receptacle 5, and the coffee liquid drips in the fluid receptacle 5. The coffee liquid held in the fluid receptacle 5 is delivered to a buffer unit 9 along the beverage path L2, and is poured into the cup C. Thereafter, based on the value of a measurement signal transmitted from the pressure sensor 8, the controller 10 halts the drip-brewing and delivering operation of the pressure difference generator 7, and completes delivering of the coffee liquid to the cup C. Then, the controller 10 moves the fluid receptacle 5 to the lower position by using the fluid receptacle moving mechanism, and moves the closable lid in the opening direction by using the closable lid opening and closing mechanism. As a result, the beverage dispenser 1' is set to the standby state.

According to the beverage dispenser 1' of the second embodiment, which is the pressurization type, the interval average for a plurality of values for the measured pressure P obtained in one interval can also be determined for each interval, and the thus obtained interval averages can be employed to halt the drip-brewing and delivering operation of the pressure difference generator 7. Therefore, when the pressure in the brewing chamber 4 rapidly fluctuates by repeating the increase and decrease, the change from the tendency to increase the pressure to the tendency to reduce the pressure can be easily obtained, without being affected by the rapid fluctuations of the pressure. Thus, the pressure difference generator 7 can be halted at an appropriate timing.

Thus, the pressurization type beverage dispenser capable of halting the pressure difference generator 7 at an appropriate timing in the state in which the pressure in the brewing chamber rapidly fluctuates, can be provided.

Modifications of Second Embodiment

Modifications (modification 6 to modification 10) for the control executed by the pressurization type beverage dispenser 1' of the second embodiment to halt the drip-brewing and delivering operation will now be described. The modifications 6 to 10 correspond respectively to the modifications 1 to 5 of the first embodiment, and the relationship of the amounts to be compared with regard to the interval averages is simply opposite to that in the first embodiment.

Specifically, in the second embodiment, the controller 10 determines the maximum interval average Pmax, and halts the drip-brewing and delivering operation when a condition in which (the maximum interval average Pmax)−(the interval average)≥(the threshold value ΔPc) is established (example configuration 2). However, the configuration is not limited thereto.

As another example configuration, the drip-brewing and delivering operation of the pressure difference generator 7 may be halted when the maximum interval average Pmax is determined, and when the individual interval averages for a predetermined number of intervals that follow the preceding interval, for which the maximum interval average Pmax has been determined, are sequentially less than the maximum interval average Pmax (modification 6), or the drip-brewing and delivering operation of the pressure difference generator 7 may be halted when a predetermined period set in advance has elapsed from the determination time at which the maximum interval average Pmax was determined (modification 7).

In modification 6, any number of times for sequentially reducing the interval average can be set, as needed.

Furthermore, in modification 7, the preset period from the determination time to halt the operation can be appropriately changed as needed.

Furthermore, in the second embodiment (example configuration 2) and modifications 6 and 7, the controller 10 determines the maximum interval average Pmax, and employs the maximum interval average Pmax as a reference for comparison with the succeeding interval averages. However, the configuration is not limited thereto.

As another example configuration, the controller 10 may halt the drip-brewing and delivering operation of the pressure difference generator 7 when it is detected, sequentially by a predetermined number of times (N), that regardless of the maximum interval average Pmax, the interval average Pn for a specific interval Sn is less than the interval average Pn−1 for the preceding interval Sn−1 that is earlier than and adjacent to the interval Sn (modification 8), or the controller 10 may halt the drip-brewing and delivering operation of the pressure difference generator 7 when the interval average Pn+m−1 for the latest interval Sn+m−1 of a predetermined number m of intervals is less than the interval average Pn for the earliest interval Sn by an amount equal to or less than the preset threshold value ΔPc (modification 9). In case of modifications 8 and 9, the maximum interval average Pmax need not be determined.

In the modification 8, the number of times N can be appropriately set as needed, and a group of intervals, for which sequential comparison is performed, may be set by overlapping the preceding group of intervals with the succeeding group of intervals in the same manner as in modification 3, or may be set without overlapping.

In the modification 9, the number of intervals m can be set to two or greater, and a group of intervals, for which comparison of the earliest and latest intervals is performed, may be set by overlapping the preceding group of intervals with the succeeding group of intervals in the same manner as in modification 4, or may be set without overlapping.

Furthermore, in the second embodiment (example configuration 2), the controller 10 halts the drip-brewing and delivering operation based on the results obtained by directly comparing the interval averages for the intervals adjacent to each other; however, the configuration is not limited thereto. The moving average Pnm that represents the mean of the interval average Pn for the interval Sn and the interval averages for a predetermined number m of intervals that precede the interval Sn may be calculated sequentially for each interval Sn, and when the moving average Pnm obtained for each interval Sn is less than the moving average P(n−1)n obtained for the preceding interval Sn−1 that is earlier than and adjacent to the interval Sn, the drip-brewing and delivering operation for the coffee liquid performed by the pressure difference generator 7 may be halted (modification 10).

In the second embodiment (example configuration 2), the controller 10 receives a measurement signal, indicating measured pressure obtained by performing the moving average processing for the raw data for the pressure measured by the pressure sensor 8. However, in modification 10, the moving average processing is performed also for the interval average Pn, and the interval average obtained by the moving average processing is regarded as the moving average Pnm, and halting of the drip-brewing and delivering operation is performed by employing the moving average Pnm.

The preferred embodiments of the invention and the modifications thereof have been described, and the present invention is not limited to these embodiments and modifications, and can be variously modified and altered based on the technical idea of the present invention.

Figure 8:
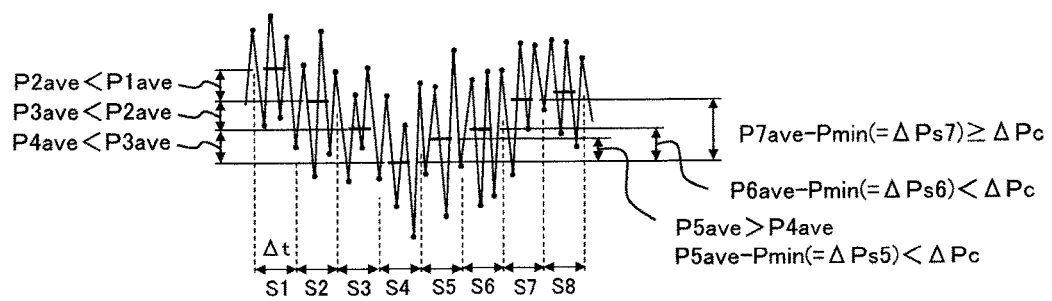
FIG. 8 is another enlarged diagram of the portion A in FIG. 4, for explaining a timing to halt the tube pump.

For example, the interval average Pn in the first embodiment (example configuration 1 and modifications 1 to 5) is the minimum value of multiple values for the measured pressure P obtained in one interval, while the interval average Pn in the second embodiment (example configuration 2 and modifications 6 to 10) is the maximum value of multiple values for the measured pressure P obtained in one interval. However, the present invention is not limited thereto, and the interval average may be, for example, the mean for multiple values for the measured pressure P obtained in one interval. When a diagram in FIG. 8 representing the same range as that illustrated in FIG. 5 is employed as an example to explain, for example, the negative-pressure suction type, the means for individual intervals S1 to S8 are P1ave to P8ave, and the controller 10 employs these means to halt the pressure difference generator 7.

In the description for all of the example configurations and the modifications, the filtering process is performed for raw data of the measurement signal indicating the measured pressure P, and the measurement signal obtained by the filtering process is transmitted to the controller 10 as a measurement signal of the measured pressure P transmitted from the pressure sensor 8. However, the present invention is not limited to this operation. For example, raw data obtained by the pressure sensor 8 may be directly transmitted to the controller 10, and the controller 10 may perform the filtering process for the raw data, and may regard, as the interval average, the minimum value, the maximum value or the mean for each interval of the data obtained by the filtering process. Furthermore, in a case in which comparatively only a few sharp changes occur due to noise, the filtering process may not be performed for raw data. In this case, the raw data for the measurement signal is transmitted to the controller 10, and the minimum value, the maximum value or the mean for each interval of the raw data is employed as the interval average. Furthermore, in a case in which an unstable pressure period is not present immediately after the drip-brewing and delivering operation is started, or in a case in which the fluctuation amount of the pressure is small and can be ignored, the disregard time period T3 may not be provided.

The beverage dispenser has been described by employing a case in which a coffee liquid is to be served; however, a beverage to be served is not limited to coffee, and, for example, green tea can also be served. In this case, tea leaves are supplied as a raw material to the brewing chamber 4. Furthermore, the beverage is not limited to coffee or tea drink, and so long as a beverage can be produced by brewing, any type of beverage can be employed. Furthermore, hot water has been supplied to the brewing chamber 4; however, water is not limited to hot water, and cold water may be supplied. The beverage can be produced in the same manner by supplying cold water.

The beverage dispenser 1 has been described by being incorporated in a server that serves the beverage in a cup. However, the dispenser is not limited to this type, and may be incorporated in a cup-serving automatic vending machine.

As described above, according to the beverage dispenser proposed by the present invention, the filter is arranged between the lower end of the cylindrical brewing chamber and the upper end of the fluid receptacle, and the pressure difference generator generates a pressure difference between the pressure in the brewing chamber and the pressure in the fluid receptacle, forces the beverage in the brewing chamber to drip into the fluid receptacle, and delivers the beverage to a cup. Furthermore, for the intervals of a preset time length, the controller sequentially determines the interval average for a plurality of values for pressure measured by the pressure sensor that measures the pressure in the fluid receptacle or in the brewing chamber, and halts, based on the comparison results for the interval averages, the drip-brewing and delivering operation for the beverage performed by the pressure difference generator.

As described above, the interval average of multiple values for the measured pressure obtained in one interval is determined for individual intervals, and the obtained interval averages are employed to halt the drip-brewing and delivering operation of the pressure difference generator. Therefore, even when the pressure in the brewing chamber or the pressure in the fluid receptacle rapidly fluctuates by repeating the increase and decrease, the change from the tendency to increase the pressure to the tendency to reduce, or the change from the tendency to reduce the pressure to the tendency to increase, can be properly identified without being adversely affected by the rapid fluctuations. As a result, the pressure difference generator, such as an air pump or a tube pump, can be halted at an appropriate timing.

Therefore, the beverage dispenser can be provided that can halt the pressure difference generator, such as an air pump or a tube pump, at an appropriate timing in the state in which the pressure in the brewing chamber and the pressure in the fluid receptacle rapidly fluctuate.

What is claimed is:

1. A beverage dispenser, in which a filter is arranged between a lower end of a cylindrical brewing chamber and an upper end of a fluid receptacle, and a beverage that has been brewed by supplying a raw material and water to the brewing chamber is forced to drip into the fluid receptacle through the filter, and is thereafter delivered to a cup along a beverage path, comprising:

a pressure difference generator configured to generate, based on a received drive signal, a pressure difference between a pressure in the brewing chamber and a pressure in the fluid receptacle to force the beverage to drip into the fluid receptacle, and to deliver the beverage to the cup;

a pressure sensor configured to measure, and output a signal representative of, the pressure in the fluid receptacle or the pressure in the brewing chamber; and a controller having: a receiver configured to receive signals from components of the beverage dispenser, including signals from the pressure sensor, a transmitter configured to transmit operation signals to the components of the beverage dispenser, and a driver configured transmit the drive signal to the pressure difference generator to drive the pressure difference generator, the controller being configured to sequentially determine, for each interval of a preset time length, an interval average of a plurality of values for pressure measured by the pressure sensor, the values being based on a plurality of the signals output from the pressure sensor, and halt, based on results of comparison of the interval averages, a drip-brewing and delivering operation for the beverage performed by the pressure difference generator, by controlling the drive signal.

2. The beverage dispenser according to claim 1, wherein the controller halts the drip-brewing and delivering operation based on results obtained by comparing the interval averages for intervals that are adjacent to each other.

3. The beverage dispenser according to claim 1, wherein the controller sequentially calculates, for each interval, a moving average that represents a mean of an interval average for a specific interval and interval averages for a predetermined number of intervals that precede the specific interval, and halts the drip-brewing and delivering operation based on the results obtained by comparing the moving averages for intervals that are adjacent to each other.

4. The beverage dispenser according to claim 1, wherein the pressure sensor measures the pressure in the fluid receptacle, and wherein the pressure difference generator is a pump that is arranged partway along the beverage path, and that reduces the pressure in the fluid receptacle by drawing air from the fluid receptacle by suction to generate the pressure difference, forces a beverage to drip from the brewing chamber into the fluid receptacle by using the pressure difference, and delivers a dripped beverage into the cup by suction.

5. The beverage dispenser according to claim 4, wherein in a case in which an interval average for a specific interval is greater than an interval average for a preceding interval that is earlier than and adjacent to the specific interval, the controller determines the interval average for the preceding interval as a minimum interval average, and wherein when a predetermined period of time has elapsed from time of determination of the minimum interval average, the controller halts the drip-brewing and delivering operation of the pressure difference generator.

6. The beverage dispenser according to claim 4, wherein the controller sequentially calculates, for each interval, a moving average that represents a mean of an interval average for a specific interval and interval averages for a predetermined number of intervals that precede the specific interval, and wherein when the moving average obtained for the specific interval is greater than the moving average obtained for the preceding interval that is earlier than and adjacent to the specific interval, the controller halts the drip-brewing and delivering operation for the beverage performed by the pressure difference generator.

7. The beverage dispenser according to claim 4, wherein when it is sequentially detected that an interval average for a specific interval is greater than an interval average for a preceding interval that is earlier than and adjacent to the specific interval, the controller halts the drip-brewing and delivering operation of the pressure difference generator.

8. The beverage dispenser according to claim 4, wherein when an interval average for the latest interval of a predetermined number of sequential intervals is greater than an interval average for the earliest interval by an amount equal to or greater than a preset threshold value, the controller halts the drip-brewing and delivering operation of the pressure difference generator.

9. The beverage dispenser according to claim 1, wherein the pressure sensor measures the pressure in the brewing chamber, and wherein the pressure difference generator is an air pump that pressurizes the brewing chamber by supplying compressed air to the brewing chamber to generate a pressure difference, forces a beverage to drip from the brewing chamber into the fluid receptacle by using the pressure difference, and delivers the beverage to the cup along the beverage path.

10. The beverage dispenser according to claim 9, wherein in a case in which an interval average for a specific interval is less than an interval average for a preceding interval that is earlier than and adjacent to the specific interval, the controller determines the interval average for the preceding interval as a maximum interval average, and wherein when a predetermined period of time has elapsed from time of determination of the maximum interval average, the controller halts the drip-brewing and delivering operation of the pressure difference generator.

11. The beverage dispenser according to claim 9, wherein the controller sequentially calculates, for each interval, a moving average that represents a mean of an interval average for a specific interval and interval averages for a predetermined number of intervals that precede the specific interval, and wherein when the moving average obtained for the specific interval is less than the moving average obtained for the preceding interval that is earlier than and adjacent to the specific interval, the controller halts the drip-brewing and delivering operation for the beverage performed by the pressure difference generator.

12. The beverage dispenser according to claim 9, wherein when it is sequentially detected that an interval average for a specific interval is less than an interval average for a preceding interval that is earlier than and adjacent to the specific interval, the controller halts the drip-brewing and delivering operation of the pressure difference generator.

13. The beverage dispenser according to claim 9, wherein when an interval average for the latest interval of a predetermined number of sequential intervals is less than an interval average for the earliest interval by an amount equal to or greater than a preset threshold value, the controller halts the drip-brewing and delivering operation of the pressure difference generator.

14. The beverage dispenser according to claim 4, wherein the interval average is a minimum value of a plurality of values for the measured pressure obtained in a specific interval.

15. The beverage dispenser according to claim 9, wherein the interval average is a maximum value of a plurality of values for the measured pressure obtained in a specific interval.

16. The beverage dispenser according to claim 1, wherein the interval average is a mean of a plurality of values for the measured pressure obtained in a specific interval.

17. The beverage dispenser according to claim 1, wherein when a predetermined preset period of time has elapsed from start of the drip-brewing and delivering operation for the beverage by the pressure difference generator, the controller halts the drip-brewing and delivering operation based on results obtained by comparing the individual interval averages.

* * * * *